UNITED STATES PATENT OFFICE.

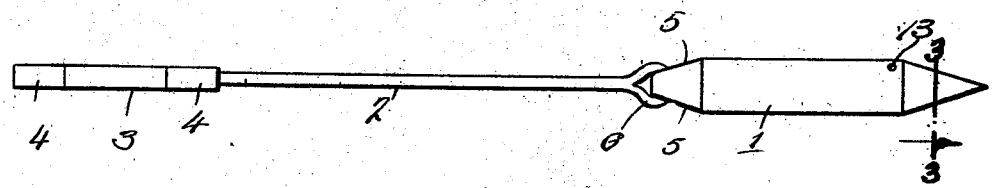

WILLIS F. WALL, OF FORT MILLS, CORREGIDOR, PHILIPPINE ISLANDS.

SOLDERING-IRON.

1,277,793.  Specification of Letters Patent.  Patented Sept. 3, 1918.

Application filed August 28, 1917. Serial No. 188,635.

*To all whom it may concern:*

Be it known that I, WILLIS F. WALL, a citizen of the United States, residing at Fort Mills, Corregidor, Philippine Islands, have invented certain new and useful Improvements in Soldering-Irons, of which the following is a specification.

This invention relates to new and useful improvements in soldering irons and the principal object of the invention is to provide a reservoir in the iron to carry a supply of solder with means for feeding the solder to the point of the iron where it is to be used.

Another object of the invention is to provide an opening adjacent the extreme point of the iron with means for feeding the solder thereto so the solder may be applied to the surface to be soldered.

A further object of the invention is to provide means for shutting off the supply of solder when desired.

Another object of the invention is to provide a device of this character, which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings, wherein like characters denote like or corresponding parts throughout the several views, and in which:

Figure 1 shows a soldering iron supplied with my invention.

Fig. 2 is a bottom view of the point of the iron.

Fig. 3 is a transverse section on line 3—3 of Fig. 1.

Fig. 4 is a section on line 4—4 of Fig. 3.

In these figures, 1 represents the point of the iron, 2 the shank and 3 the wooden handle. This handle is supplied with the metal thimbles 4. The shank is connected with the point by means of the ear 5 on said point engaging with a loop 6 on the shank.

In carrying out my invention I provide a circular recess 7 adjacent the extreme end of the point, and the bottom of this recess has opening into it the three passages 8, 9 and 10. These passages are formed in the point adjacent the inclined side thereof which is opposite the inclined side in which the recess 7 is formed. The upper ends of said passages open into the recesses 12, 13 and 14 formed in the straight sides of the point adjacent the inclined sides, and one of these recesses is located in the top side of the point, that is, the side opposite that in which the recess 7 is located. The other two recesses are formed one in one side and one in the other and adjacent the top side, as clearly shown in Fig. 3. In this manner the bottom side of the point, or the side from which the solder is applied, is left intact so as to hold the heat. I provide a plug 15 for closing the passages when desired.

It will be understood that only one passage is used at a time, and that the other passages are provided to make the device capable of being used in different positions. For instance in soldering the side of a tank, a man using his right hand would place the solder in recess 14, the other recesses being plugged up, and a man using his left hand will use the recess 13. Recess 12 will be used on flat or horizontal surfaces. As will be seen the plug 15 is placed in the ends of the passages where they communicate with the recesses. As before stated, the passages are in the upper part of the iron so as to not interfere with the heating of the iron.

The solder will be gradually fed to the recess 7 and from here it will go to the part to receive it.

It is thought from the foregoing that the advantages and novel features of my invention will be readily apparent.

I desire it to be understood that I may make slight changes in the construction and in the combination and arrangement of the several parts, provided that such changes fall within the scope of the appended claim.

I claim as my invention:

A soldering iron, having a distributing recess in its lower side near the point, and having a plurality of passages leading upwardly therefrom through the body of the iron, near the top and opposite sides, said passages tapering throughout their length and opening through the sides of the body near the tapering end thereof.

In testimony whereof I affix my signature in presence of two witnesses.

WILLIS F. WALL.

Witnesses:
FREDERICK STRAHIN,
WILLIAM C. BARBIERI.